United States Patent
Shih et al.

(10) Patent No.: US 8,585,211 B2
(45) Date of Patent: Nov. 19, 2013

(54) OPTICAL SENSING APPARATUS, FILTER APPARATUS, AND PROJECTOR WITH ANTI-DUST STRUCTURE

(75) Inventors: Fu-Shiung Shih, Tai-Chung Hsien (TW); Chun-Ming Shen, Taipei (TW)

(73) Assignee: Qisda Corporation, Taoyuan County (TW)

( * ) Notice: Subject to any disclaimer, the term of this patent is extended or adjusted under 35 U.S.C. 154(b) by 380 days.

(21) Appl. No.: 12/957,416

(22) Filed: Dec. 1, 2010

(65) Prior Publication Data
US 2011/0255060 A1   Oct. 20, 2011

(30) Foreign Application Priority Data
Apr. 18, 2010  (CN) .......................... 2010 1 0166156

(51) Int. Cl.
*G03B 21/14* (2006.01)
*F21V 9/00* (2006.01)
*G02B 5/22* (2006.01)
*G02B 7/00* (2006.01)

(52) U.S. Cl.
USPC ............................. 353/84; 362/293; 359/892

(58) Field of Classification Search
USPC ............. 353/84, 31, 119, 122; 359/885, 889, 359/892; 348/743, 742; 352/42; 362/293, 362/583; 461/1; 250/231.13–231.18
See application file for complete search history.

(56) References Cited

U.S. PATENT DOCUMENTS
2006/0132720 A1 *  6/2006  Goo ................................ 353/84

* cited by examiner

*Primary Examiner* — William C Dowling
*Assistant Examiner* — Ryan Howard

(57) ABSTRACT

An optical sensing apparatus with anti-dust structure, for sensing a rotation device which has a rotation surface rotating along a rotation direction, includes a base, an optical sensor, and a stop block. The stop block is located beside the optical sensor and disposed with the optical sensor on the base in accordance with the order of the rotation direction. A distance between a stagnation surface of the stop block and the rotation surface is shorter than a distance between a sensing surface of the optical apparatus and the rotation surface. When an air flow passes between the stagnation surface and the rotation surface, dust within the air flow could be partially deposited on the stagnation surface so as to reduce the deposition amount of the dust on the sensing surface. A filter apparatus with the optical sensing apparatus and a projector with the filter apparatus are also disclosed.

20 Claims, 5 Drawing Sheets

OPTICAL SENSING APPARATUS, FILTER APPARATUS, AND PROJECTOR WITH ANTI-DUST STRUCTURE

BACKGROUND OF THE INVENTION

1. Field of the Invention

The invention relates to an optical sensing apparatus, a filter apparatus, and a projector, and especially relates to an optical sensing apparatus, a filter apparatus, and a projector with anti-dust structure.

2. Description of the Prior Art

As the dependence on electronic equipment of people increases, the adaptability to environment of the electronic equipment is promoted. In general, a housing of electronic equipment generating heat has a plurality of vents formed thereon for air to pass through for taking away heat generated in operation by electronic components inside the housing. However, in some environments, such as arid zones, there is often fine dust floating in the air. The fine dust enters the housing with an air flow, and a part of the dust deposits on the surfaces of the electronic components. This situation does not matter for a general requirement of heat dissipation. But for an electronic component, such as an optical sensor, needing to sense exterior information, the sensing function of the electronic component is reduced or fails when a certain amount of dust deposits on the surface of the electronic component. Especially for an optical sensor for controlling rotation speed of a color wheel motor of a projector, once the optical sensor fails, the projector cannot work correctly any more.

Furthermore, because the rotation speed of the color wheel motor is quite high and the optical sensor for sensing the rotation speed of the motor is very close to the rotation surface of the motor, the air flow induced by the motor due to the rotation makes more dust deposit on the surface of the optical sensor. Besides, the rotation surface of the motor generates static electricity thereon due to high speed rotation, and the rotation surface attracts more dust easily so as to worsen the problem of the dust deposition on the surface of the optical sensor. Moreover, when the dust attracted on the rotation surface lies in the marks used by the optical sensor, the sensitivity of the optical sensor decreases so that the sensing function of the optical sensor is reduced, even to fail. When the color wheel motor and the optical sensor are sealed, the sealed structure can avoid dust but obstructs dissipating heat from the color wheel motor, which leads to instability of the rotation speed of the motor and projecting images with errors of color.

SUMMARY OF THE INVENTION

An objective of the invention is to provide an optical sensing apparatus with anti-dust structure for sensing a rotation surface of a rotation device. The optical sensing apparatus uses the anti-dust structure to greatly reduce the dust deposition so that electronic equipment with the optical sensing apparatus can proceed to operating and any damage induced by a user disassembling and assembling the electronic equipment for removing dust is avoided.

The optical sensing apparatus with anti-dust structure for sensing a rotation device having a rotation surface rotating along a rotation direction. The optical sensing apparatus includes a base, an optical sensor, and a stop block. The optical sensor is disposed on the base. The optical sensor has a sensing surface opposite to the rotation device. A first distance is formed between the sensing surface and the rotation surface. The stop block is disposed at a side of the optical sensor. The stop block and the optical sensor are disposed on the base in accordance with an order of the rotation direction. The stop block has a stagnation surface. A second distance is formed between the stagnation surface and the rotation surface, and the second distance is smaller than or equal to the first distance.

The stop block is located beside the optical sensor, which obstructs the path of the air flow with dust. Besides, a narrow flow passage is formed between the stagnation surface and the rotation surface, which constrains the path of the air flow without retarding the rotation of the rotation device to reduce the opportunity for the dust to deposit. When the rotation device rotates, the air flow induced by the rotation surface can pass through only the narrow flow passage and most of the dust carried within the air flow stays on the stagnation surface of the stop block. When more and more dust deposits on the stagnation surface, the narrow flow passage is narrower so that it is difficult for the later air flow to flow in; that is, the opportunity for the later dust to deposit decreases.

Obviously, the air flow passing by the optical sensor has been reduced because of the disposition of the stop block. Based on the design of the stagnation surface of the stop block, most of the dust carried within the air flow deposits on the stagnation surface before the air flow reaches the optical sensor, so as to greatly reduce the dust deposition on the sensing surface of the optical sensor, which increases the normal operation time of the optical sensor.

Another objective of the invention is to provide a filter apparatus with anti-dust structure. The filter apparatus mainly consists of a color wheel module combined with the optical sensing apparatus of the invention. The color wheel module is disposed on the base and includes the rotation device, such as a color wheel motor. As described above, the filter apparatus of the invention is equipped with the optical sensing apparatus with anti-dust structure, so the optical sensor can operate normally for a long time and the rotation speed of the color wheel motor is therefore controlled stably.

Another objective of the invention is to provide a projector with anti-dust structure. The projector mainly consists of a housing and the filter apparatus of the invention inside the housing. The housing forms an accommodating space where the components of the filter apparatus are disposed. The housing also forms a plurality of vents for air to pass through. As described above, the filter apparatus of the invention is equipped with the optical sensing apparatus with anti-dust structure, so the rotation speed of the color wheel motor is controlled stably and the projector can therefore project images correctly.

Compared with the prior art, the optical sensing apparatus, the filter apparatus, and the projector with anti-dust structure of the invention can reduce the deposition amount of the dust on the sensing surface of the optical sensor efficiently without disrupting the cooling effect on the rotation device and so on by the air flow. Therefore, when there is much dust carried within the air flow entering the housing, the optical sensing apparatus, the filter apparatus, and the projector with anti-dust structure can still operate normally, not like a conventional projector which cannot judge the rotation speed of a color wheel correctly due to the optical sensor covered with dust so as not to control the rotation speed of the color wheel properly and project correct images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
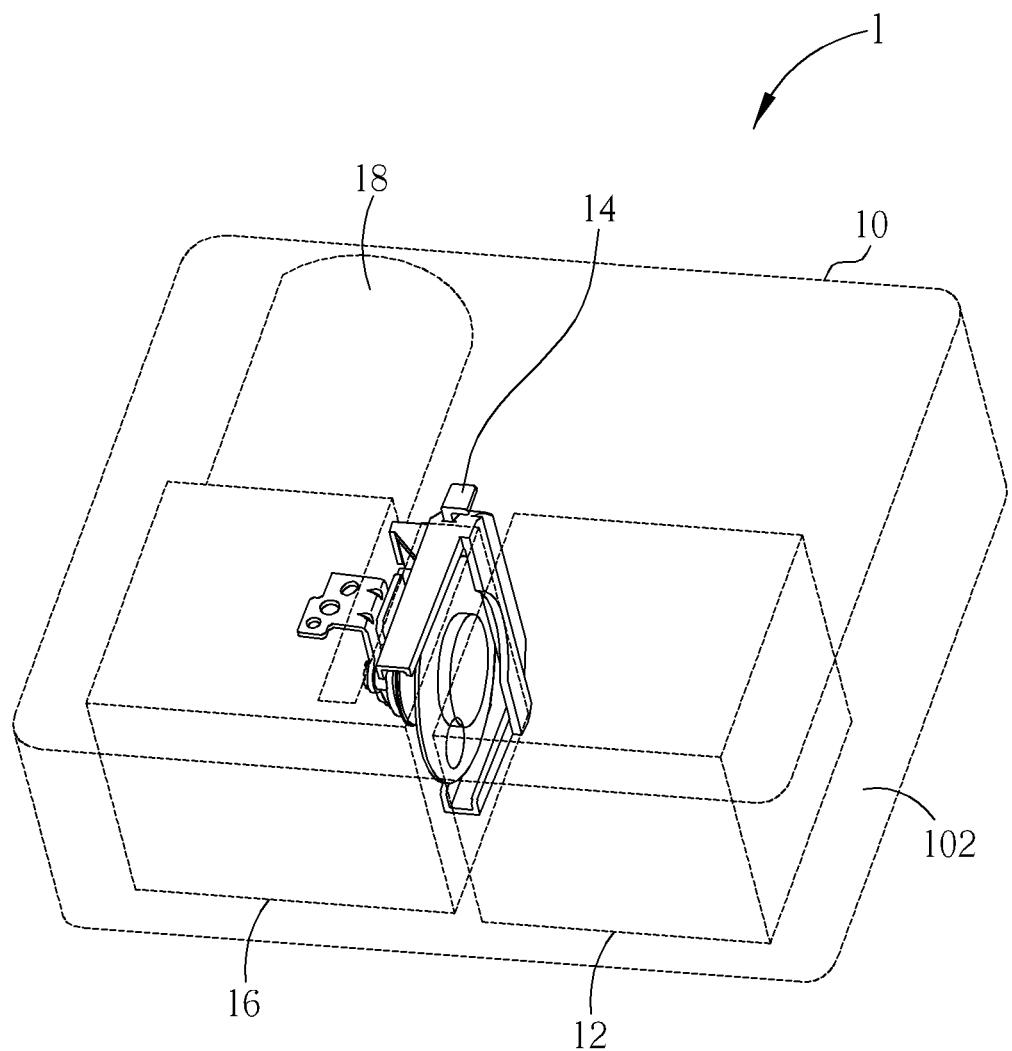
FIG. 1 is a schematic diagram of an interior structure of a projector according to a preferred embodiment of the present invention.

Please refer to FIG. 1, which is a schematic diagram of an interior structure of a projector 1 according to a preferred embodiment of the present invention. The projector 1 includes a housing 10, a light source apparatus 12, a filter apparatus 14, an optical modification apparatus 16, and a projection lens 18. The housing 10 forms an accommodating space 102 therein for accommodating the light source apparatus 12, the filter apparatus 14, the optical modification apparatus 16, the projection lens 18, and other required electronic components. Light emitted from the light source apparatus 12 passes through the filter apparatus 14 to provide required color lights to the optical modification apparatus 16. The optical modification apparatus 16 can include a digital micromirror device (DMD) or a liquid crystal display (LCD) for modifying the color lights to form required images which are projected on a screen through the projection lens 18 later. In order to highlight the position of the filter apparatus 14, the filter apparatus 14 is shown in solid lines and other components in dashed lines in FIG. 1.

Figure 2:
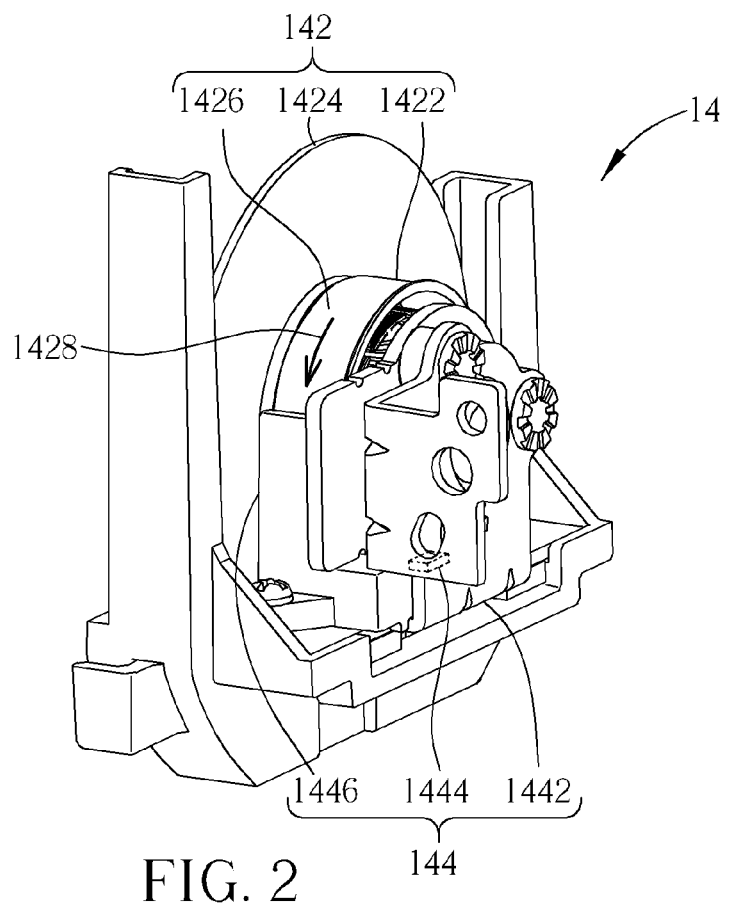
FIG. 2 is a perspective schematic diagram of the filter apparatus in FIG. 1.

Please refer to FIG. 2, which is a perspective schematic diagram of the filter apparatus 14 in FIG. 1. The filter apparatus 14 includes a color wheel module 142 and an optical sensing apparatus 144. The color wheel module 142 includes a rotation device 1422 and a filter lens 1424 mounted on the rotation device 1422. In the embodiment, the rotation device 1422 can be a color wheel motor for rotating the filter lens 1424. The rotation device 1422 has a rotation surface 1426 rotating along a rotation direction 1428 shown by an arrow in FIG. 2. A mark (not shown in the figures) can be formed on the rotation surface 1426 for an optical sensor 1444 to identify. The optical sensing apparatus 144 includes a base 1442, an optical sensor 1444 (the position thereof approximately shown in dashed lines), and a stop block 1446. The optical sensor 1444 is disposed on the base 1442. The stop block 1446 is disposed at a side of the optical sensor 1444. The stop block 1446 and the optical sensor 1444 are disposed on the base 1442 in accordance with an order of the rotation direction 1428.

The stop block 1446 can be an injection part of plastic and mounted on the base 1442 by screws. In an application, the stop block 1446 can be mounted alternatively by way of adhering or locking. In addition, the color wheel module 142 and the optical sensing apparatus 144 are integrated to be disposed. The base 1442 is designed to be capable of supporting the color wheel module 142 and the optical sensing apparatus 144 and performing other functions simultaneously. For example, the base 1442 connects with the light source apparatus 12, the optical modification apparatus 16, or the housing 10.

Figure 3:
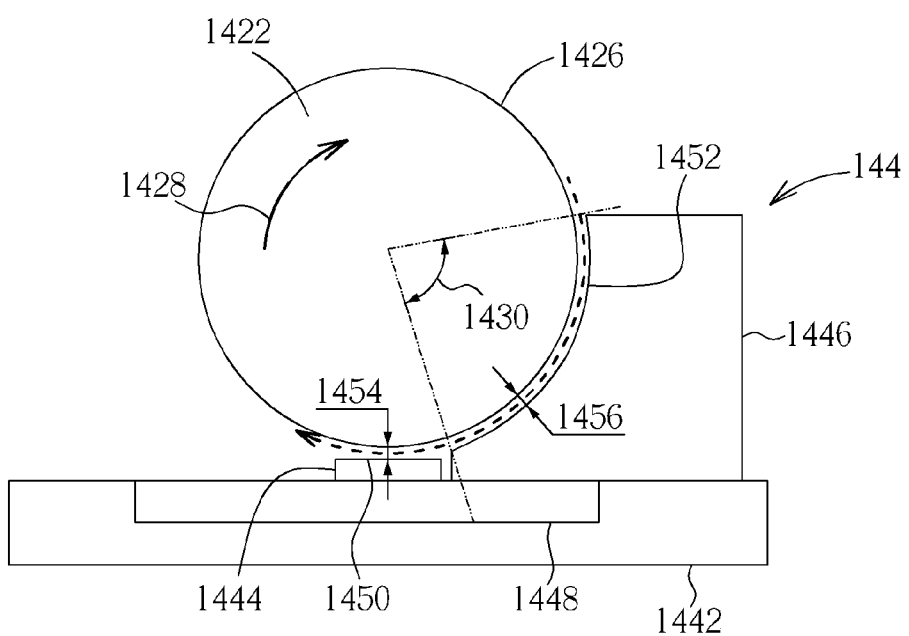
FIG. 3 is a simplified schematic diagram of the rotation device and the optical sensing apparatus in FIG. 2.

Please refer to FIG. 3, which is a simplified schematic diagram of the rotation device 1422 and the optical sensing apparatus 14 in FIG. 2. The view direction thereof is the direction of the rotation axis of the rotation device 1422, and the filter lens 1424 is omitted. In FIG. 3, a circuit board 1448 is disposed on the base 1442, and the optical sensor 1444 is electrically connected to the circuit board 1448. In an application, the rotation device 1422 can be electrically connected to the circuit board 1448 too. The control system of the projector 1 can perform signal detecting on the optical sensor 1444 and control the rotation of the rotation device 1422 simultaneously through the circuit board 1448.

The optical sensor 1444 has a sensing surface 1450 opposite to the rotation surface 1426 for sensing rotation information of the rotation device 1422, e.g. for sensing the mark disposed on the rotation surface 1426 so as to calculate the rotation speed of the rotation device 1422. The stop block 1446 has a stagnation surface 1452 which is substantially parallel to the rotation surface 1426 to be a curve surface, but the invention is not limited to this. In principle, there exists a substantially-smooth flow passage between the rotation surface 1426 and the stagnation surface 1452. A first distance 1454 is formed between the sensing surface 1450 and the rotation surface 1426. A second distance 1456 is formed between the stagnation surface 1452 and the rotation surface 1426. In the embodiment, the second distance 1456 is substantially equal to the first distance 1454. In an application, the second distance 1456 can be smaller than the first distance 1454; that is, the sensing surface 1450 is lower than the stagnation surface 1452, which is more conducive to the improvement on the deposition amount of the dust on the sensing surface 1450. The deposition of dust will be described in the following paragraphs.

In the embodiment, the rotation device 1422 can be a color wheel motor, of which the rotation speed can reach above 7200 rpm, so the rotation surface 1426 induces an air flow thereon during rotating at a high speed, as shown by a dashed line with an arrow in FIG. 3. Because the gap (the second distance 1456) between the stagnation surface 1452 and the rotation surface 1426 is small, the rotation surface 1426 and the stagnation surface 1452 form the narrow flow passage therebetween. The induced air flow is constrained only in the narrow flow passage to pass past the rotation surface 1426 and the stagnation surface 1452. In other words, only the air flow close to the rotation surface 1426 can pass through the narrow flow passage, so the effect of the air flow (and the floating particles carried within) to the sensing surface 1450 is greatly reduced.

Figure 4:
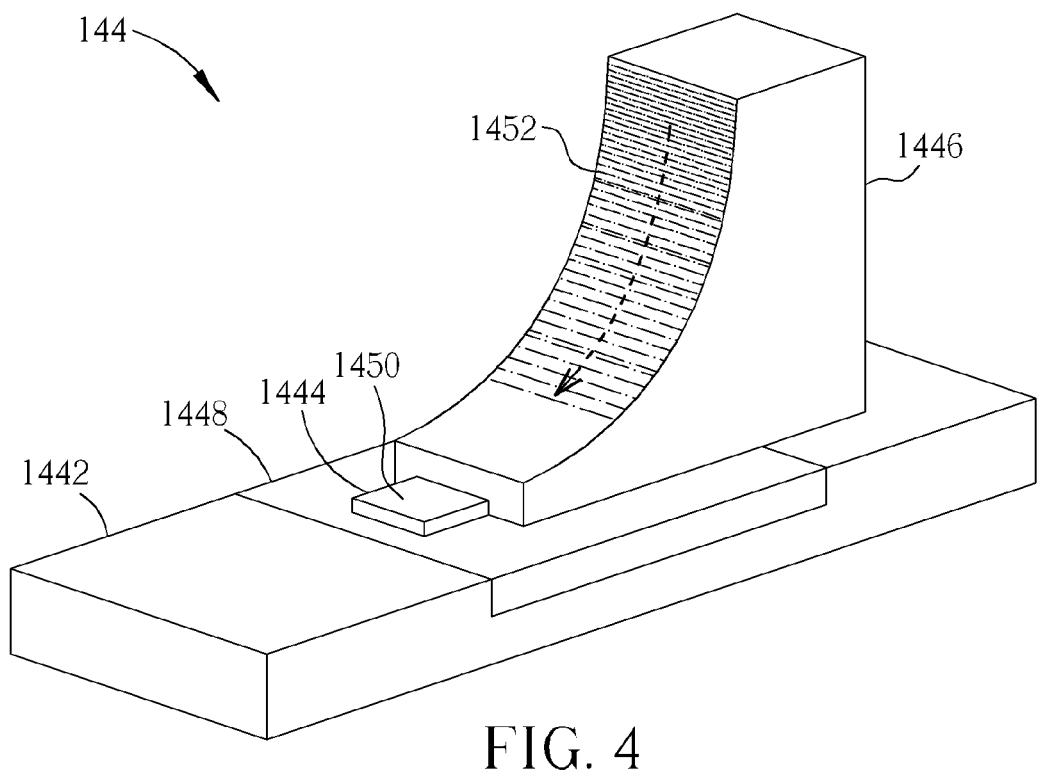
FIG. 4 is a schematic diagram of the deposition distribution on the stagnation surface in FIG. 3.

Further, when the environment, e.g. dry and windy climate (such as continental climate), for use of the projector 1 is dust-rich, the projector 1 introduces the air with dust into the housing 10 for its heat dissipation requirement, so that the rotation device 1422 rotates at a high speed to induce an air flow with dust. The optical sensing apparatus 144 according to the invention has the design of the anti-dust structure, i.e. the narrow flow passage formed by the stagnation surface 1452 and the rotation surface 1426, for reducing the flux of the air flow through the flow passage, so only a few amount of the air flow with dust passes through the flow passage. When the air flow passes between the stagnation surface 1452 and the rotation surface 1426, part of the dust carried within the air flow deposits on the stagnation surface 1452. Besides, the deposition of the dust occurs once the air flow enters the narrow flow passage, so the amount of the dust carried within the air flow is less and less as the air flow flows to the rear section of the flow passage, and the amount of the dust deposited on the rear section of the stagnation surface 1452 is therefore less. That is, the closer position of the stagnation surface 1452 to the optical sensor 1444 is, the less amount of the dust will deposit. A schematic diagram for the deposition distribution is shown as FIG. 4, wherein, the flow direction of the air flow is indicated by the dashed line with an arrow.

According to the present invention, the amount of the dust carried within the air flow is reduced significantly at a portion around the sensing surface 1450, that is, the dust deposited on the sensing surface 1450 is even less than that without the stop block 1446. Further, an increment in the length of the narrow flow passage can increase the deposition amount of the dust carried within the air flow before the air flow reaches the sensing surface 1450; that is, it is capable of reducing the deposition amount of the dust deposited on the sensing surface 1450. In the embodiment, the stagnation surface 1452 can be preferred to cover the rotation surface 1426 about 90 degrees of rotation angle 1430; that is, the length of the narrow flow passage is about one fourth of the circumference of the rotation device 1422. However, the invention is not limited to this. The covered angle of the stagnation surface 1452 can be more than 90 degrees or a smaller degree of, for example, 30 degrees, 45 degrees, or 60 degrees. Therefore, the area of the sensing surface 1450 covered by dust is reduced, and the normal operation time of the optical sensor 1444 extends; that is, the rotation speed of the rotation device 1422 can be properly controlled, and the projector 1 can therefore project images precisely.

Figure 5:
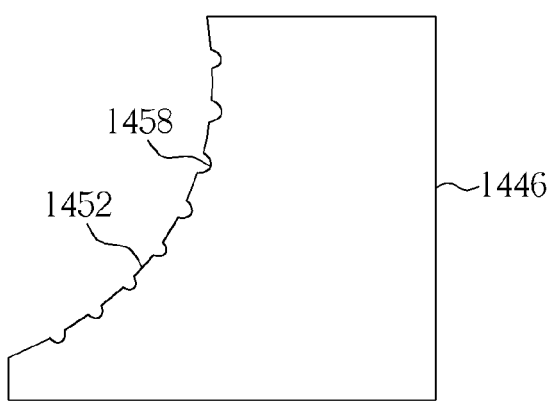
FIG. 5 is a side view of the stop block.

Please refer to FIG. 5, which is a side view of the stop block 1446. In order to increase more the dust carried within the air flow passing through the flow passage to be deposited on the stagnation surface 1452, a plurality of depressions 1458 can be formed on the stagnation surface 1452 for catching the dust deposited on the stagnation surface 1452 in practice and also increasing the deposition amount of the dust, and the amount of the dust carried within the air flow passing by the sensing surface 1450 is therefore decreased, i.e. to decrease the amount of the dust deposited on the sensing surface 1450. Similarly, the stagnation surface 1452 can be formed to be a wavy or saw-toothed surface, which also has the effect of catching the deposited dust. In addition, the stagnation surface 1452 can be formed to be a rough surface, which also has the effect of catching the dust and increasing the deposition amount of the dust, especially for fine dust. It is added that the depressions 1458 in FIG. 5 are exaggeratedly shown. In practice, the quantity and density of disposition of the depressions 1458 formed on the stagnation surface 1452 depends on experiments on practical products, not limited to FIG. 5.

Figure 6:
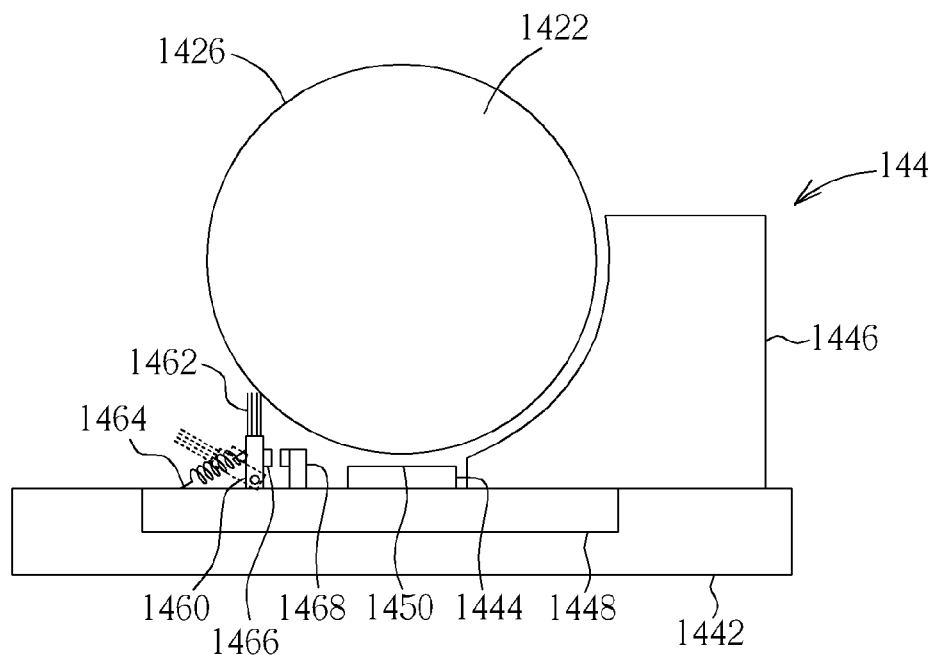
FIG. 6 is a simplified schematic diagram of a cleaning apparatus for cleaning the rotation surface, the rotation device, and the optical sensing apparatus.

Please refer to FIG. 6, which is a simplified schematic diagram of a cleaning apparatus for cleaning the rotation surface 1426, the rotation device 1422, and the optical sensing apparatus 144. The structure in FIG. 6 is similar to that in FIG. 3, so the components described in same names are not introduced repeatedly. The cleaning apparatus includes a brush holder 1460, bristles 1462, a spring 1464, a magnetic object 1466, and a magnetic-force generating device 1468. In one preferable embodiment, the bristles 1462 is foldable according to the requirement, as one example, when the rotation device 1422 is not required cleaning, the bristles 1462 can be folded close to the base 1422; when the rotation device 1422 is required cleaning, the bristles 1462 can be erected in an upright status. The spring 1464 (or other elastic object) provides elastic force to pull the brush holder 1460 to the base 1442, or to push the brush holder 1460 to the base 1442 (e.g. the spring 1464 disposed between the brush holder 1460 and the magnetic-force generating device 1468). The magnetic object 1466 is mounted on the brush holder 1460. The magnetic-force generating device 1468 is used for generating magnetic force to attract the magnetic object 1466 so that the brush holder 1460 overtakes the pull force produced by the spring 1464 to rotate away from the base 1442. The bristles 1462 touch the rotation surface 1426 so as to clean the rotation surface 1426, e.g. to clean the dust or other impurities adhering to the rotation surface 1426 off.

Figure 7:
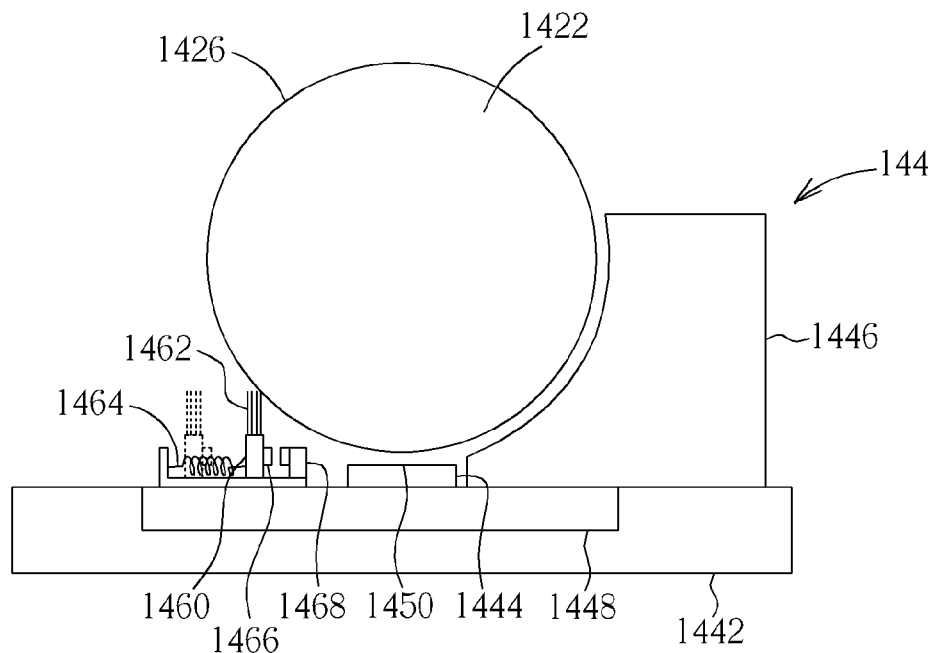
FIG. 7 is a schematic diagram of the cleaning apparatus for cleaning the rotation surface in a different motion to FIG. 6.

The magnetic-force generating device 1468 can be realized with an electromagnet. If the magnetic object 1466 is a permanent magnet and the magnetic-force generating device 1468 is an electromagnet, the coils of the magnetic-force generating device 1468 are electrified with currents of different directions so as to achieve the effect of attraction or repulsion on the permanent magnet and the disposition of the spring 1464 can therefore be omitted. Similarly, if the magnetic object 1466 and the magnetic-force generating device 1468 are electromagnets, the effect of attraction or repulsion therebetween can be realized by controlling the magnetic poles thereof. In addition, the motion of the brush holder 1460 can be a sliding on the base 1442 (as shown in FIG. 7) for replacing the rotation motion mentioned above; that is, the action of the brush holder 1460 can be realized with a slide. It is added that the position for the cleaning apparatus in a standby state is shown in dashed lines in FIGS. 6 and 7. In addition, if the bristles 1462 are made of soft material, the bristles 1462 can remain on the position for cleaning the rotation surface 1426 without the disposition of the magnetic object 1466 and the magnetic-force generating device 1468 for rotating the bristles 1462 from the rotation surface 1426.

Figure 8:
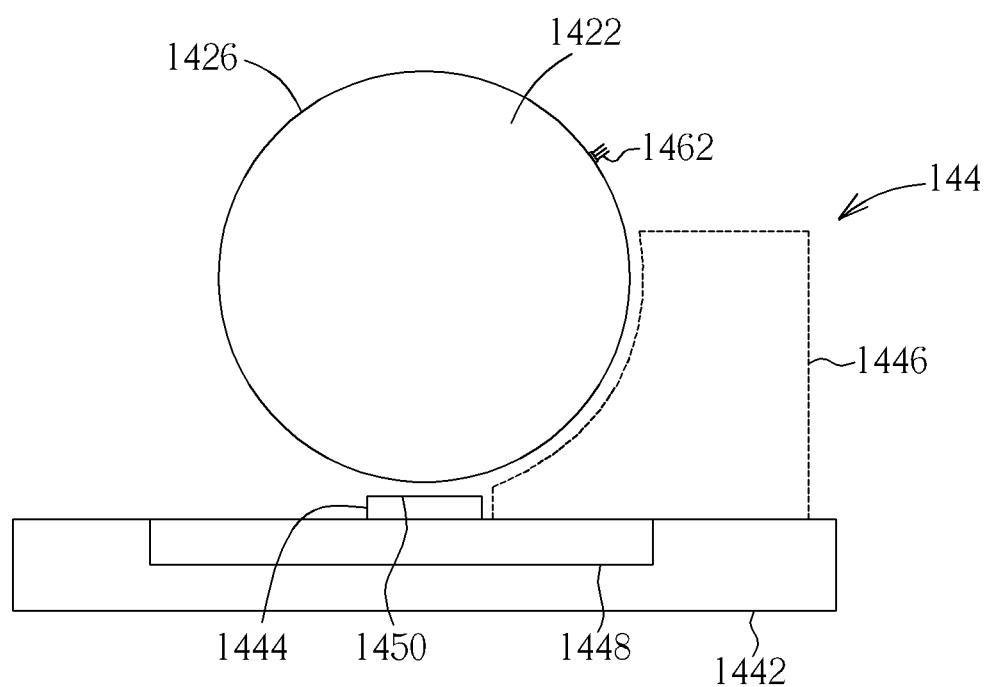
FIG. 8 is a simplified schematic diagram of the cleaning apparatus for cleaning the sensing surface and the optical sensing apparatus.

Similarly, there also is a cleaning apparatus for the sensing surface 1450 on the rotation device 1422, e.g. for cleaning the dust or other impurities adhering on the sensing surface 1450 off. Please refer to FIG. 8, which is a simplified schematic diagram of the cleaning apparatus for cleaning the sensing surface 1450 and the optical sensing apparatus 144. The stop block 1446 in FIG. 8 is shown in dashed lines. In the configuration in FIG. 8, the cleaning apparatus can includes only bristles 1462 (and a small brush holder for holding the bristles 1462) disposed on the rotation surface 1426. During the rotation of the rotation device 1422, the bristles 1462 can brush the sensing surface 1450 for cleaning the dust or other impurities adhering to the sensing surface 1450 off and also for cleaning the dust or other impurities adhering to the stagnation surface 1452 off. In this case, the stop block 1446 can be omitted. Under the consideration to the function of the stop block 1446, the bristles 1462 does not need to clean the sensing surface 1450 continually, so the cleaning apparatus can be designed to be extendable to be disposed in the rotation device 1422. The bristles 1462 of the cleaning apparatus extend out the rotation surface 1426 if cleaning is required. It is added that the cleaning apparatuses for cleaning the rotation surface 1426 and the sensing surface 1450 respectively can exist simultaneously, which is not limited to the configurations in the above figures.

In addition, the projector and the filter apparatus thereof are taken as examples in the above embodiments, but the invention is not limited to this. The invention is applied to any application using an optical sensor for sensing a rotation device, for example a control over a rotation speed of a heat-dissipation fan of an electrical box.

Compared with the prior art, the optical sensing apparatus, the filter apparatus, and the projector with anti-dust structure of the invention can reduce the deposition amount of the dust on the sensing surface of the optical sensor efficiently without disrupting the cooling effect on the rotation device and so on by the air flow. Therefore, when there is much dust carried within the air flow entering the housing, the optical sensing apparatus, the filter apparatus, and the projector of the invention can still operate normally, not like a conventional projector which cannot judge the rotation speed of a color wheel correctly due to the optical sensor covered with dust so as not to control the rotation speed of the color wheel properly and project correct images.

Those skilled in the art will readily observe that numerous modifications and alterations of the device and method may be made while retaining the teachings of the invention.

What is claimed is:

1. An optical sensing apparatus with anti-dust structure for sensing a rotation device having a rotation surface encircling and rotating around a rotating axis along a rotation direction, the optical sensing apparatus comprising:
    a base;
    an optical sensor, disposed on the base, the optical sensor having a sensing surface opposite to the rotation device, a first distance being formed between the sensing surface and the rotation surface; and
    a stop block, disposed at a side of the optical sensor, the stop block and the optical sensor being disposed on the base in accordance with an order of the rotation direction to form a narrow flow passage between a stagnation surface of the stop block and the rotation surface, a second distance being formed between the stagnation surface and the rotation surface, wherein the second distance is smaller than or equal to the first distance, and when the rotation device rotates, an air flow induced by the rotation surface passes through the narrow flow passage before the optical sensor.

2. The optical sensing apparatus of claim 1, wherein the sensing surface is lower than the stagnation surface.

3. The optical sensing apparatus of claim 1, wherein the stagnation surface covers the rotation surface more than 45 degrees of rotation angle.

4. The optical sensing apparatus of claim 1, wherein the stagnation surface is a curve surface.

5. The optical sensing apparatus of claim 1, wherein a plurality of depressions are formed on the stagnation surface.

6. The optical sensing apparatus of claim 1, wherein the stagnation surface is a rough surface.

7. A filter apparatus with anti-dust structure, the filter apparatus comprising:
    a base;
    a color wheel module, disposed on the base, the color wheel module comprising a rotation device having a rotation surface encircling and rotating around a rotating axis along a rotation direction;
    an optical sensor, disposed on the base, the optical sensor having a sensing surface opposite to the rotation device, a first distance being formed between the sensing surface and the rotation surface; and
    a stop block, disposed at a side of the optical sensor, the stop block and the optical sensor being disposed on the base in accordance with an order of the rotation direction to form a narrow flow passage between a stagnation surface of the stop block and the rotation surface, a second distance being formed between the stagnation surface and the rotation surface, wherein the second distance is smaller than or equal to the first distance, and when the rotation device rotates, an air flow induced by the rotation surface passes through the narrow flow passage before the optical sensor.

8. The filter apparatus of claim 7, wherein the color wheel module comprises a filter lens mounted on the rotation device.

9. The filter apparatus of claim 7, wherein the sensing surface is lower than the stagnation surface.

10. The filter apparatus of claim 7, wherein the stagnation surface covers the rotation surface more than 45 degrees of rotation angle.

11. The filter apparatus of claim 7, wherein the stagnation surface is a curve surface.

12. The filter apparatus of claim 7, wherein a plurality of depressions are formed on the stagnation surface.

13. The filter apparatus of claim 7, wherein the stagnation surface is a rough surface.

14. A projector with anti-dust structure, the projector comprising:
    a housing, an accommodating space being formed inside the housing;
    a base, disposed in the accommodating space;
    a color wheel module, disposed on the base, the color wheel module comprising a rotation device having a rotation surface encircling and rotating around a rotating axis along a rotation direction;
    an optical sensor, disposed on the base, the optical sensor having a sensing surface opposite to the rotation device, a first distance being formed between the sensing surface and the rotation surface; and
    a stop block, disposed at a side of the optical sensor, the stop block and the optical sensor being disposed on the base in accordance with an order of the rotation direction to form a narrow flow passage between a stagnation surface of the stop block and the rotation surface, a second distance being formed between the stagnation surface and the rotation surface, wherein the second distance is smaller than or equal to the first distance, and when the rotation device rotates, an air flow induced by the rotation surface passes through the narrow flow passage before the optical sensor.

15. The projector of claim 14, wherein the color wheel module comprises a filter lens mounted on the rotation device.

16. The projector of claim 14, wherein the sensing surface is lower than the stagnation surface.

17. The projector of claim 14, wherein the stagnation surface covers the rotation surface more than 45 degrees of rotation angle.

18. The projector of claim 14, wherein the stagnation surface is a curve surface.

19. The projector of claim 14, wherein a plurality of depressions are formed on the stagnation surface.

20. The projector of claim 14, wherein the stagnation surface is a rough surface.

* * * * *